United States Patent
Liu et al.

(10) Patent No.: US 11,275,802 B2
(45) Date of Patent: Mar. 15, 2022

(54) MICROAPP SUBSCRIPTION RECOMMENDATIONS

(71) Applicant: Citrix Systems, Inc., Ft. Lauderdale, FL (US)

(72) Inventors: Xin Liu, Nanjing (CN); Taodong Lu, Nanjing (CN); Peng Yao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/931,747

(22) Filed: May 14, 2020

(65) Prior Publication Data

US 2021/0319071 A1  Oct. 14, 2021

Related U.S. Application Data

(63) Continuation of application No. PCT/CN2020/084144, filed on Apr. 10, 2020.

(51) Int. Cl.
*G06F 16/9535* (2019.01)
*H04L 29/08* (2006.01)
(Continued)

(52) U.S. Cl.
CPC ........ *G06F 16/9535* (2019.01); *H04L 67/025* (2013.01); *H04L 67/22* (2013.01); *H04L 67/306* (2013.01)

(58) Field of Classification Search
CPC .......... G06F 16/9535; G06F 8/61; G06F 8/62; H04L 67/025; H04L 67/22; H04L 67/306; H04L 65/1063; H04L 12/1403
See application file for complete search history.

(56) References Cited

U.S. PATENT DOCUMENTS 8,312,450 B2 * 11/2012 Gangadharappa et al.
9,110,685 B2 *  8/2015 Suryanarana et al.
(Continued)

FOREIGN PATENT DOCUMENTS

CN     102054004 A    5/2011
CN     106101250 A   11/2016
(Continued)

OTHER PUBLICATIONS

Ruiz, "Citrix Workspace Microapps Service", retrieved from https://docs.citrix.com/en-us/tech-zone/learn/tech-briefs/workspace-microapps.html (Feb. 4, 2020).
(Continued)

*Primary Examiner* — Patrice L Winder
(74) *Attorney, Agent, or Firm* — Finch & Maloney PLLC

(57) ABSTRACT

A system that comprises a microapp server includes a memory and at least one processor coupled to the memory. The microapp server is configured to generate a recommendation to modify a set of one or more subscribed microapps. The microapp server is configured to gather observational data that characterizes interactions of a user with an endpoint. The user is associated with the set of one or more subscribed microapps. The microapp server is further configured to identify, based on the observational data, a modification to the set of one or more subscribed microapps. The microapp server is further configured to send, to an administration console, the recommendation to modify the set of one or more subscribed microapps in accordance with the identified modification.

18 Claims, 5 Drawing Sheets

(51) Int. Cl.
  *H04L 67/50* (2022.01)
  *H04L 67/306* (2022.01)
  *H04L 67/025* (2022.01)

(56) References Cited

U.S. PATENT DOCUMENTS

| | | | |
|---|---|---|---|
| 9,280,252 | B1 | 3/2016 | Brandmaier et al. |
| 9,405,665 | B1 | 8/2016 | Shashi et al. |
| 9,471,624 | B1 * | 10/2016 | Patil .................. G06F 8/62 |
| 10,621,062 | B2 | 4/2020 | Ligman et al. |
| 10,817,270 | B2 * | 10/2020 | Straub et al. |
| 10,848,500 | B2 * | 11/2020 | Bhattacharya .......... H04L 67/26 |
| 2006/0117059 | A1 | 6/2006 | Freeman et al. |
| 2012/0278736 | A1 | 11/2012 | Tran et al. |
| 2013/0227386 | A1 | 8/2013 | Ferlin |
| 2013/0251126 | A1 | 9/2013 | Hollander et al. |
| 2013/0326499 | A1 * | 12/2013 | Mowatt .................. G06F 8/60 717/177 |
| 2014/0020068 | A1 * | 1/2014 | Desai .................. H04L 63/10 726/4 |
| 2014/0351052 | A1 | 11/2014 | Khalsa et al. |
| 2015/0026660 | A1 | 1/2015 | Vaidyanathan et al. |
| 2015/0356495 | A1 | 12/2015 | Virdi et al. |
| 2017/0212650 | A1 | 7/2017 | Sinyagin et al. |
| 2017/0277396 | A1 | 9/2017 | Chung et al. |
| 2018/0081986 | A1 | 3/2018 | Sitik et al. |
| 2019/0065177 | A1 | 2/2019 | Khoongumjorn et al. |
| 2019/0324890 | A1 | 10/2019 | Li et al. |
| 2020/0026502 | A1 | 1/2020 | Moore et al. |

FOREIGN PATENT DOCUMENTS

| | | |
|---|---|---|
| CN | 106201624 A | 12/2016 |
| CN | 109117164 A | 1/2019 |
| CN | 110007986 A | 7/2019 |
| CN | 110069463 A | 7/2019 |
| CN | 110806975 A | 2/2020 |

OTHER PUBLICATIONS

Wiffen, "Building a simple Citrix microapp that shows blog posts from a WordPress RSS feed", The Curious Kabri (Blog), retrieved from https://kabri.uk/2019/12/18/building-a-simple-citrix-microapp-that-shows-blog-posts-from-a-wordpress-rss-feed/ (posted Dec. 18, 2019).

Xu, "An Algorithm for Comparing Similarity Between Two Trees", thesis submitted in partial fulfillment of the requirements for the degree of Master of Science in the Department of Computer Science in the Graduate School of Duke University, retrieved from https://arxiv.org/pdf/1508.03381.pdf (submitted Aug. 13, 2015).

"About the MDX Toolkit", retrieved from https://docs.citrix.com/en-us/mdx-toolkit/about-mdx-toolkit.html (Oct. 29, 2019).

"Citrix Workspace Intelligence—Customer FAQ", retrieved from https://www.citrix.com/content/dam/citrix/en_us/documents/reference-material/citrix-workspace-intelligence-customer-faq.pdf (Oct. 2019).

"Citrix Insight Services", retrieved from https://docs.citrix.com/en-us/citrix-virtual-apps-desktops/manage-deployment/cis.html (Dec. 18, 2019).

"Microapps", retrieved from https://docs.citrix.com/en-us/citrix-microapps.html (Jan. 9, 2020).

U.S. Appl. No. 16/862,781, (filed Apr. 30, 2020).

Notice of Allowance in related U.S. Appl. No. 16/862,781 (dated May 13, 2021) 9 pages.

International Search Report dated Dec. 25, 2020 for International Application No. PCT/CN2020/081406, 4 pages.

International Search Report dated Dec. 29, 2020 for International Application No. PCT/CN2020/084144, 4 pages.

Written Opinion of the International Searching Authority dated Dec. 25, 2020 for International Application No. PCT/CN2020/081406, 4 pages.

Written Opinion of the International Searching Authority dated Dec. 29, 2020 for International Application No. PCT/CN2020/084144, 4 pages.

Zhu Han; et al., "Learning Tree-based Deep Model for Recommender Systems", Applied Data Science Track Paper, KDD 2018, The 24th ACM SIGKDD International Conference on Knowledge Discovery Data Mining, Aug. 19-23, 2018, 10 pages.

International Search Report and Written Opinion dated Jun. 24, 2021 for International Application No. PCT/US2021/026946, 12 pages.

* cited by examiner

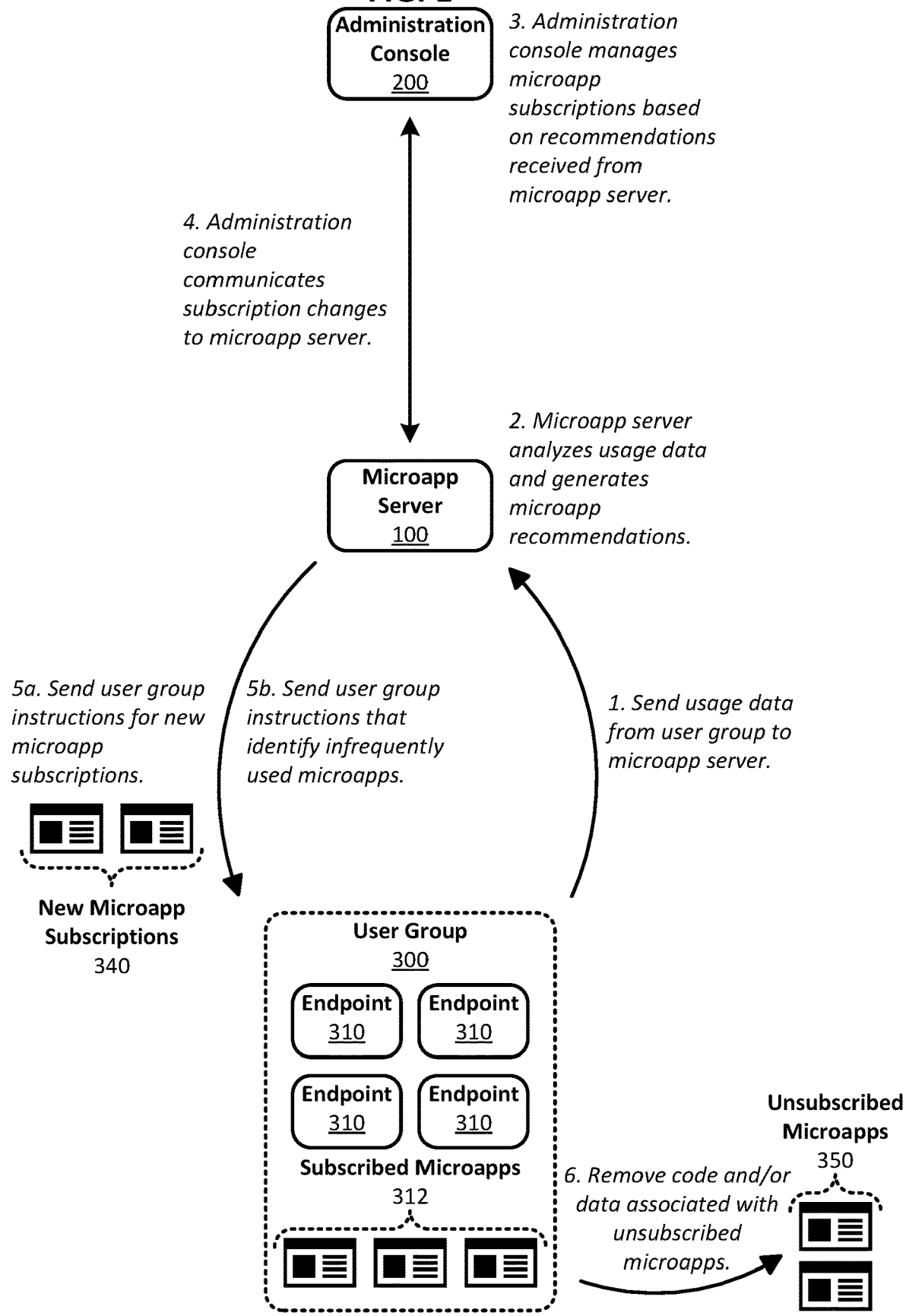

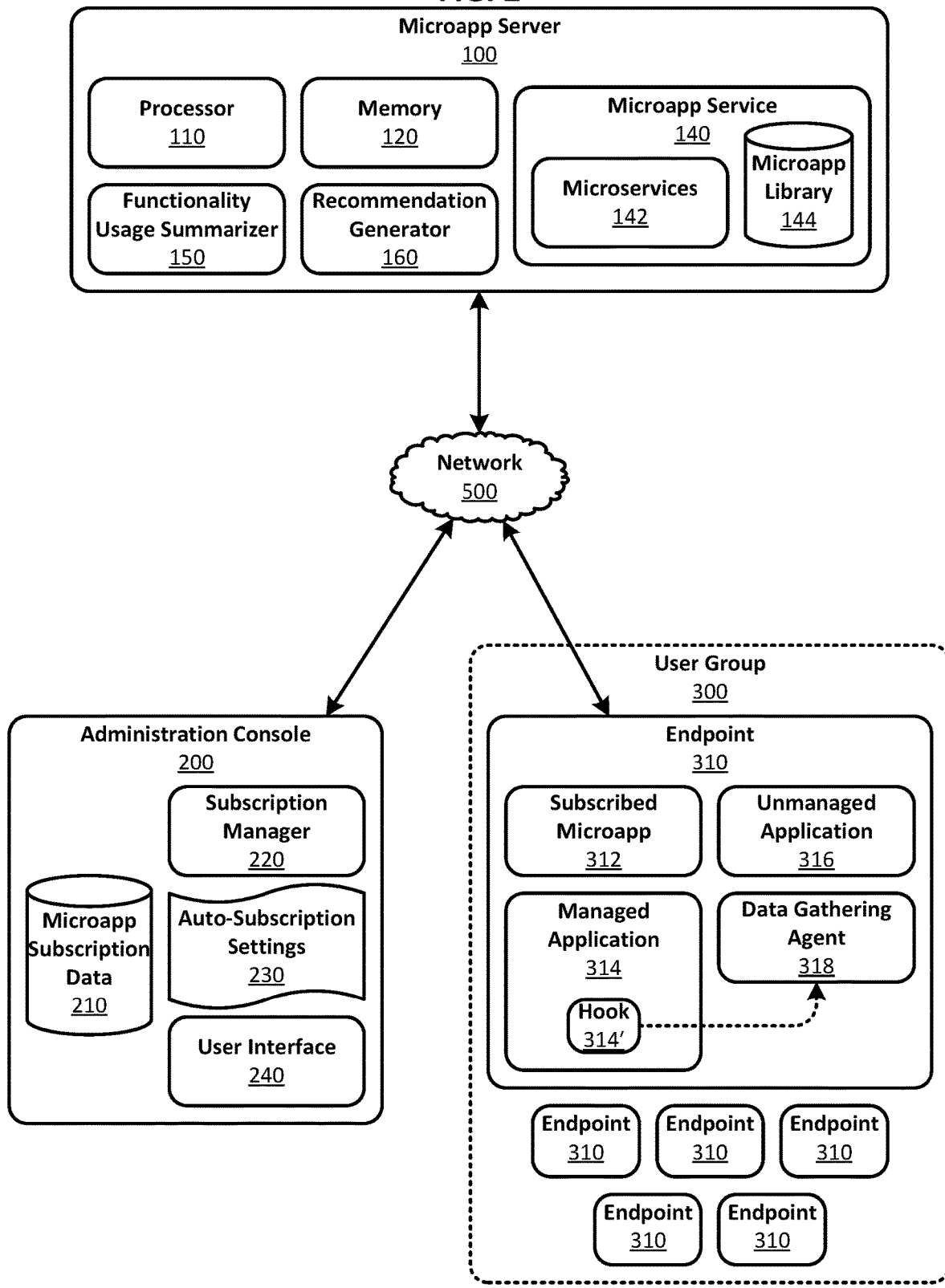

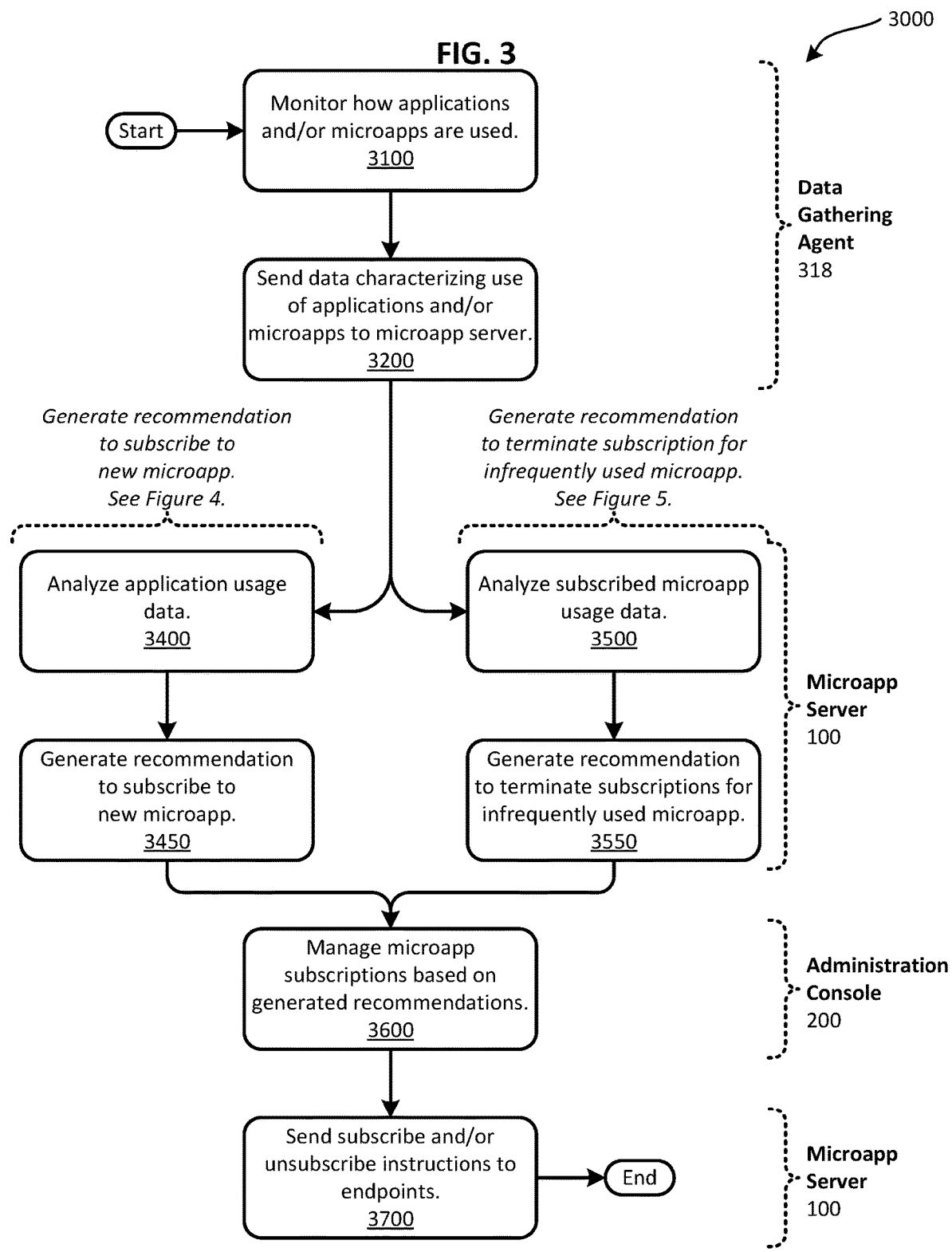

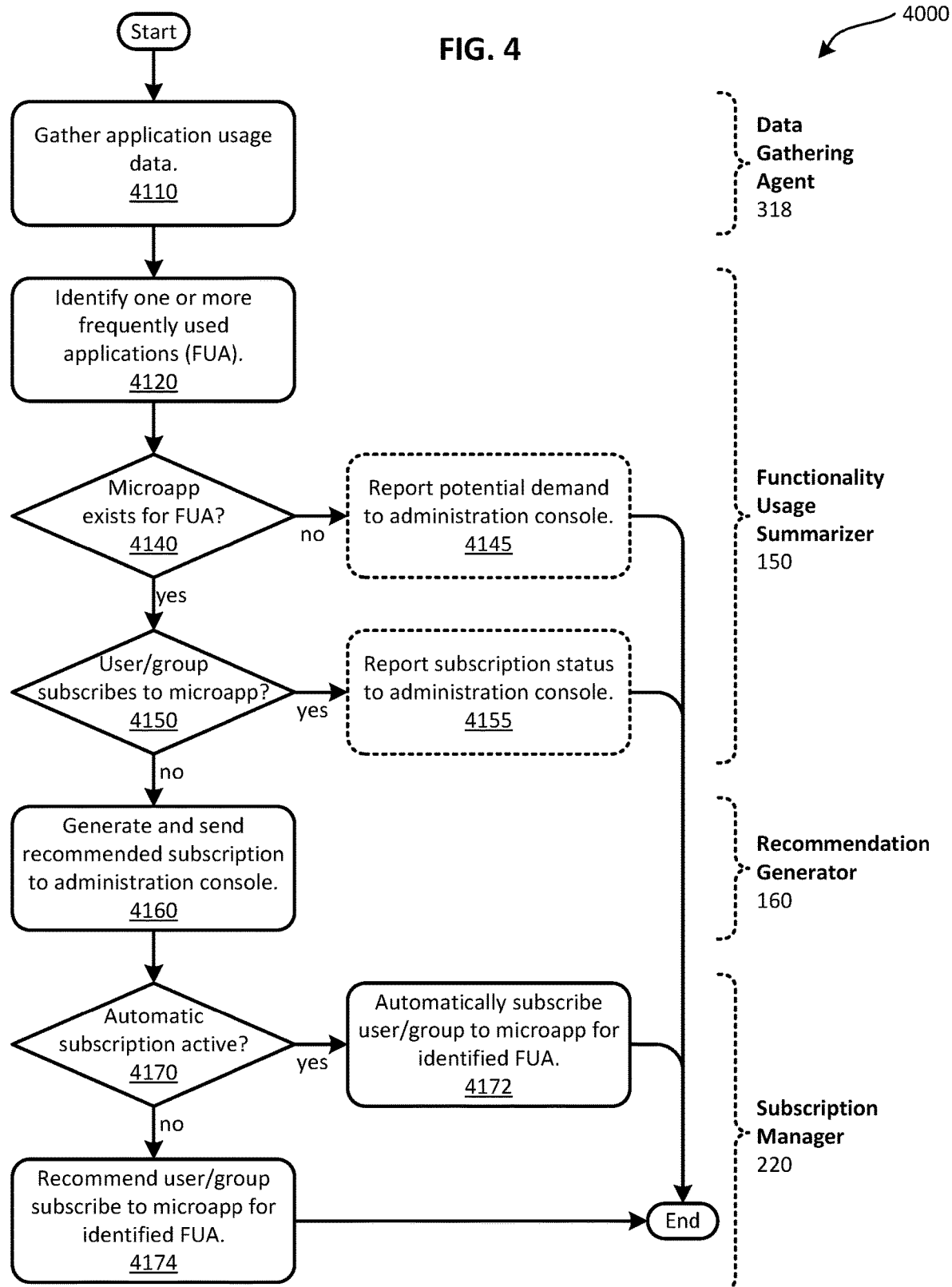

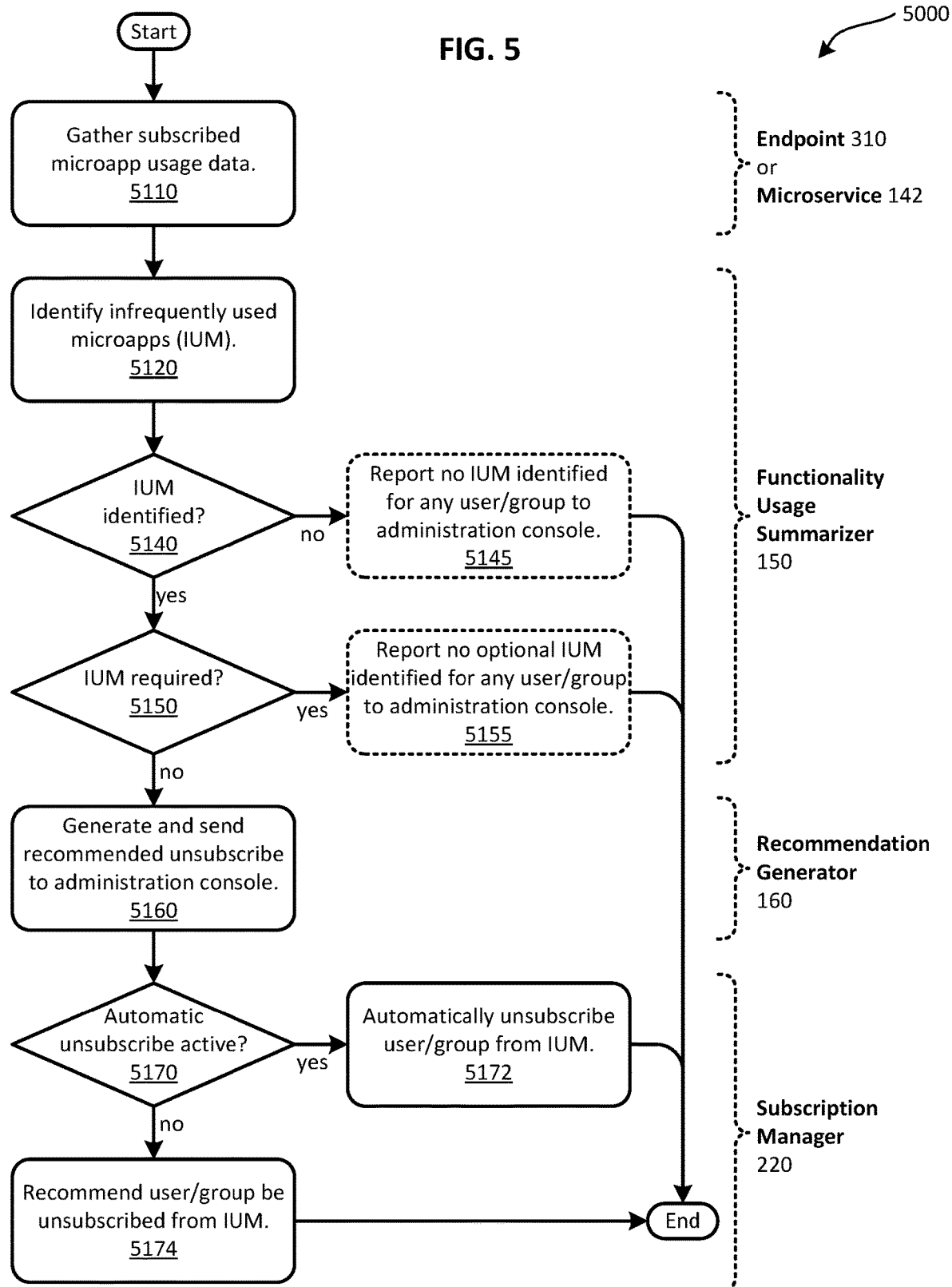

MICROAPP SUBSCRIPTION RECOMMENDATIONS

CROSS-REFERENCE TO RELATED APPLICATION

This application is a continuation of International Application PCT/CN2020/084144 (filed 10 Apr. 2020), the entire disclosure of which is hereby incorporated by reference herein.

BACKGROUND

A microapp is a lightweight software application that synchronizes data from one or more complex enterprise applications to provide a user with specific, targeted functionality. Microapps provide a user with this functionality in a streamlined manner via a relatively simple, contained interface. Generally, a user can access the functionality provided by a microapp without needing to launch a new application or toggle to a different application window. Microapps thus allow users to complete simple tasks within the context of an existing application environment, such as a web browser, a digital workspace, or other similar context. Microapps are often referred to as "cross-platform" software applications because they typically execute within the context of a native application that serves as a container that isolates the microapp from idiosyncrasies of different operating system platforms.

SUMMARY

In a first example implementation, a system that comprises a microapp server includes a memory and at least one processor coupled to the memory. The microapp server is configured to generate a recommendation to modify a set of one or more subscribed microapps. The microapp server is configured to gather observational data that characterizes interactions of a user with an endpoint. The user is associated with the set of one or more subscribed microapps. The microapp server is further configured to identify, based on the observational data, a modification to the set of one or more subscribed microapps. The microapp server is further configured to send, to an administration console, the recommendation to modify the set of one or more subscribed microapps in accordance with the identified modification. Some examples of the system can include features from one or more of the following implementations.

In a second example implementation, the microapp server is further configured to implement the recommendation in response to determining that an auto-subscription setting indicates that at least some recommendations generated by the microapp server are to be implemented automatically.

In a third example implementation, the administration console is hosted at the microapp server; and the administration console is configured to display the recommendation in a user interface before implementing the recommendation.

In a fourth example implementation, the observational data characterizes interactions of a plurality of users with a corresponding plurality of endpoints; the microapp server is further configured to identify a user group that includes the user, wherein each user included in the user group has associated therewith a corresponding set of one or more subscribed microapps; and the recommendation is a recommendation to modify each set of one or more subscribed microapps.

In a fifth example implementation, the observational data indicates that the user invoked a particular functionality using a managed application; identifying the modification includes identifying, based on the observational data, a new microapp that provides the particular functionality; and the recommendation is a recommendation to add the new microapp to the set of one or more subscribed microapps.

In a sixth example implementation, identifying the modification includes identifying, based on the observational data, an infrequently used microapp that is included in the set of one or more subscribed microapps; and the recommendation is a recommendation to remove the infrequently used microapp from the set of one or more subscribed microapps.

In a seventh example implementation, a method for identifying a recommended microapp comprises receiving, from an endpoint, at a microapp server, observational data that characterizes interactions between a user of the endpoint and an application. A particular one of the interactions causes the application to provide a particular functionality. The user is associated with a set of one or more subscribed microapps. The method further comprises identifying, by the microapp server, based on the observational data, a new microapp that provides the particular functionality. The method further comprises sending, to an administration console, a recommendation that the new microapp be added to the set of one or more subscribed microapps that is associated with the user. Some examples of the method can include features from one or more of the following implementations.

In an eighth example implementation, the method further comprises updating the set of one or more subscribed microapps to include the new microapp.

In a ninth example implementation, identifying the new microapp includes making a determination that the new microapp is not included in the set of one or more subscribed microapps.

In a tenth example implementation, the administration console is hosted at the microapp server.

In an eleventh example implementation, the recommendation is sent from the microapp server to the administration console via a network.

In a twelfth example implementation, the observational data characterizes interactions between a plurality of users and a plurality of applications; and more than one of the plurality of users is observed to have invoked the particular functionality using the particular interaction.

In a thirteenth example implementation, the observational data characterizes interactions between a plurality of users and a plurality of applications; more than one of the plurality of users is observed to have invoked the particular functionality using the particular interaction; and identifying the new microapp includes determining that the particular interaction is observed at a frequency that is greater than a threshold frequency during a time period.

In a fourteenth example implementation, identifying the new microapp includes determining that the particular interaction is observed at a frequency that is greater than a threshold frequency.

In a fifteenth example implementation, identifying the new microapp includes determining that the particular interaction is one of n-most-frequently observed interactions, n 10.

In a sixteenth example implementation, identifying the new microapp includes querying a microapp library for microapps that provide the particular functionality.

In a seventeenth example implementation, the particular interaction includes the user initially launching the application.

In an eighteenth example implementation, the observational data further characterizes a number of times the user has used the application during a time period.

In a nineteenth example implementation, a non-transitory computer readable medium stores processor executable instructions to identify an infrequently-used microapp. The processor executable instructions comprise instructions to gather, at a microapp server, observational data that characterizes interactions between a user of an endpoint and a set of one or more subscribed microapps that is associated with the user. The processor executable instructions comprise instructions to identify, by the microapp server, based on the observational data, an infrequently used microapp that is included in the set of one or more subscribed microapps. The processor executable instructions comprise instructions to send, to an administration console, a recommendation that the infrequently used microapp be removed from the set of one or more subscribed microapps that is associated with the user. Some examples of the method can include features from one or more of the following implementations.

In a twentieth example implementation, identifying the infrequently used microapp further comprises making a determination that members of a user group that includes the user are not required to subscribe to the infrequently used microapp.

In a twenty-first example implementation, the processor executable instructions further comprise instructions to receive, from the administration console, an indication that the set of one or more subscribed microapps has been modified to exclude the infrequently used microapp.

In a twenty-second example implementation, the processor executable instructions further comprise instructions to update the set of one or more subscribed microapps to exclude the infrequently used microapp.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this disclosure. However, the figures are not intended as a definition of the limits of any particular example. The figures, together with the remainder of this disclosure, serve to explain principles and operations of the described and claimed aspects. In the figures, each identical or nearly identical component that is illustrated is represented by a like reference numeral. For purposes of clarity, every component may not be labeled in every figure.

FIG. 1 is a block diagram schematically illustrating selected data flows that are implemented in an example technique for managing microapp subscriptions for a user group.

FIG. 2 is a block diagram schematically illustrating selected components of an example framework for managing microapp subscriptions for a user or user group.

FIG. 3 is a flowchart illustrating an example method for generating recommendations to subscribe to new microapps and to unsubscribe from infrequently used microapps.

FIG. 4 is a flowchart illustrating an example method for generating recommendations to subscribe to new microapps that provide functionality associated with applications that are frequently used by a user or user group.

FIG. 5 is a flowchart illustrating an example method for generating recommendations to terminate subscriptions for microapps that are infrequently used by a user or user group.

DETAILED DESCRIPTION

As noted above, microapps provide a user with frequently-invoked functionality from a range of different applications via a relatively simple, contained interface. Microapps accomplish this by synchronizing data from a user's applications in a way that allows the user to access data and functionality provided by an underlying application without actually launching the underlying application or toggling to a different interface. User actions taken within a microapp serve as the basis for inputs provided to an underlying application. From a conceptual standpoint, microapps can thus be understood as unbundling the functionality provided by a user's applications to provide the user with simplified actions within the user's preferred working environment, such as for example a web browser or digital workspace. Examples of frequently invoked actions that can be streamlined using microapps include approving expense reports, confirming calendar appointments, submitting helpdesk tickets, and reviewing vacation requests.

The wide-ranging productivity and usability benefits of microapps has led to rapid growth in the number of available microapps. As a result, individual users may not be aware of the microapps which are most relevant to their frequently-invoked workflows. To address this, microapps are often deployed using a subscription model in which an administrator grants individual users and/or user groups access to a microapp by way of a managed subscription. Once a user is subscribed to a microapp, either via an individual subscription or membership in a subscribed user group, the user can access functionality and receive notifications provided by the subscribed microapp. For example, in the case of a user who works in the context of a digital workspace, subscribing the user to a particular microapp allows the user to access functionality associated with the subscribed microapp via his/her digital workspace. The subscription model, in principle, thus provides an efficient way to manage microapp usage in an organization, with particular microapp functionality being deployed to relevant users and/or user groups based their frequently invoked workflows. The subscription model also eliminates any need for individual users to monitor the continually growing inventory of available microapps for new offerings that could be relevant to their individual workflows. In theory, administrators will assume this responsibility.

However, as a practical matter, the subscription model relies on having an administration team that is able to accurately and efficiently generate microapp subscriptions that are specifically tailored to the needs of particular users and/or user groups. This administration process remains heavily reliant on human knowledge and intuition. For example, to generate and manage useful microapp subscriptions, administrators should know how a user leverages his/her existing microapp subscriptions, what application functionality a user frequently invokes, and what microapps are available to provide that frequently-invoked functionality. But administrators have imperfect knowledge of an organization's continually evolving workflows. Inevitably there will be microapps that, while providing functionality that members of a particular user group frequently invoke, are unknown to the relevant administration team that manages microapp subscriptions for the user group. Conversely, there will often exist subscribed microapps that, in fact, members of the user group use infrequently, if at all. These circumstances represent an inefficient usage of resources and a lost opportunity to increase user productivity.

Beyond this, because microapp subscriptions are often administered to user groups, administrators should further be able to effectively define user groups that can benefit from a common suite of subscribed microapps. In a large organization it is difficult for administrators to curate this individualized usage data across workgroups, thus presenting yet another obstacle to the efficient management of microapp subscriptions. This challenge increases as microapps become more popular and as their usage becomes more prevalent across an organization.

A more analytical approach to evaluating user activity would therefore streamline administration of microapp subscriptions by reducing reliance on human knowledge and intuition, and in particular, on the judgment and/or subjective assumptions of administrators. A more analytical approach to administering microapp subscriptions would reveal heretofore unknown microapps that could provide functionality that addresses a particular need of specific users and/or user groups. And a more analytical approach to managing user groups would allow user groups to be defined based on the application functionality that is most often invoked by individual users, thus allowing microapp subscriptions to be deployed with increased efficiency.

In view of the foregoing, disclosed herein is a framework for managing microapp subscriptions for a user or user group. In certain implementations such a framework provides the ability to analytically generate recommendations to subscribe to new microapps that correspond to functionality provided by managed applications that are frequently used by a user or user group. In other implementations such a framework provides the ability to analytically generate recommendations to unsubscribe from microapps that are infrequently used by a user or user group. In either case, such a framework allows microapp subscriptions to be more closely aligned with the functionality that users and user groups demand. This increases the efficiency of microapp deployment and reduces the administrative burden associated with manually tracking available microapps, tracking evolving user groups and workflows, and efficiently deploying microapp subscriptions across an organization. It also builds user loyalty to particular microapps by seamlessly providing a user with access to microapps that are specifically tailored to his/her needs. In certain applications, the techniques disclosed herein can be implemented in an digital workspace that intelligently provides users with microapps that are specifically tailored to their frequently-invoked workflows.

FIG. 1 is a block diagram schematically illustrating selected data flows that are implemented in an example technique for managing a collection of subscribed microapps 312 for a user group 300. This example technique begins by sending application usage data from user group 300, and more specifically from one or more endpoints 310 associated with user group 300, to a microapp server 100. See Step 1 in FIG. 1. In this context, user group 300 comprises a plurality of users, each of which is associated with at least one of the one or more endpoints 310. An individual user's association with an endpoint may exist by virtue of, for example, the user being logged into, authenticated to, or otherwise using the endpoint. While user group 300 is illustrated in FIG. 1 as including only four endpoints 310, it will be appreciated that user group 300 may include fewer or more endpoints in other implementations, and in general, may contain any suitable number of endpoints. For example, in an alternative embodiment, application usage can be analyzed and managed for individual users, in which case user group 300 could be understood as including as few as a single endpoint, at least in the case where a particular user works with only a single endpoint.

Regardless of the number of endpoints included in user group 300, the application usage data characterizes how the users comprising user group 300 interact with various applications, including for example "software as a service" (SaaS) applications, web applications, desktop applications, proprietary applications, managed enterprise applications, unmanaged applications, and/or existing microapps to which members of user group 300 already subscribe. In some cases, the type of application being monitored may affect how the application usage data is gathered. For example, in the case of existing subscribed microapps, usage data can be gathered directly at microapp server 100, thus eliminating any need to send usage data from endpoints 310. Additional details with respect to how the application usage data is collected from the one or more endpoints 310 will be provided in turn.

After receiving the application usage data, microapp server 100 analyzes the application usage data and generates microapp recommendations. See Step 2 in FIG. 1. The microapp recommendations may include recommendations to create one or more new microapp subscriptions 340 and/or recommendations to unsubscribe from one or more of the existing subscribed microapps 312. For example, the application usage data may provide insight into (a) which frequently-invoked functionalities lack a corresponding subscribed microapp, and (b) infrequently used microapps that are nevertheless provided pursuant to a dedicated subscription. The microapp recommendations identify a particular microapp as well as a particular user or user group for which the recommendation is made. Additional details with respect to how the microapp recommendations are generated will be provided in turn. These microapp recommendations are provided to an administration console 200 that manages microapp subscriptions based on the recommendations received from microapp server 100. See Step 3 in FIG. 1. Depending on its configuration, administration console 200 may in some cases automatically implement the microapp recommendations, for example by automatically creating new microapp subscriptions 340 or automatically terminating existing microapp subscriptions. Alternatively, in other cases administration console 200 may present the microapp recommendations to an administrator for approval before actually implementing the recommendations.

Regardless of whether the microapp recommendations are implemented automatically or with administrator approval, administration console 200 communicates any subscription changes to microapp server 100. See Step 4 in FIG. 1. Microapp server 100 then deploys the subscription changes to user group 300 by (a) sending user group 300 instructions for new microapp subscriptions 340 (see Step 5a in FIG. 1), and/or (b) sending user group 300 instructions that identify infrequently used microapps (see Step 5b in FIG. 1). Subscribed microapps 312 that are identified as being infrequently used can be considered as unsubscribed microapps 350. Optionally, code and/or data associated with unsubscribed microapps 350, if any, may be removed from the relevant endpoints 310. See Step 6 in FIG. 1. Additional details with respect to how microapp recommendations are deployed from administration console 200 to microapp server 100 to members of user group 300 will be provided in turn.

A number of advantages may be derived from the various implementations of the framework for managing microapp subscriptions described herein. For example, certain of the techniques disclosed herein rely on collecting and analyzing application usage data from a large number of users working in a diverse range of usage contexts. Microapp recommendations that are developed based on this usage data do not necessarily rely on the knowledge, intuition, or subjective evaluation of a human administrator. In particular, the resulting microapp recommendations are based on application usage patterns that could be difficult or impossible for human analysts to identify. Certain of the techniques disclosed herein also enable microapp recommendations to be specifically tailored to a particular user group and the application usage patterns associated with that user group. Accurately managing microapp subscriptions may not be feasible for a human administrator, particularly in a large organization. The ability to provide users with subscriptions to microapps that are closely tailored to their needs will ultimately lead to improved user experience and productivity. In particular, by automatically providing a user with access to (that is, subscriptions to) microapps that provide that user's frequently-invoked functionality, this provides an improvement over existing systems wherein a useful microapp might remain unknown or otherwise hidden to the user. Thus, certain of the implementations disclosed herein automatically provide users with access to those microapps that are closely aligned with their frequently-invoked workflows.

As used herein, the term "microapp" refers, in addition to its ordinary meaning, to a lightweight software application configured to provide a user with simplified access to specific functionality and/or data that is provided by one or more underlying applications. For example, microapps allow a user to view information and perform actions without launching or switching context to a particular underlying application. Microapps streamline workflows by reducing context switching and eliminating the need to learn how to use complex applications. Microapps are often deployed using a subscription model in which an administrator grants individual users and/or user groups access to a microapp by way of a managed subscription. Once a user is subscribed to a microapp, either via an individual subscription or membership in a subscribed user group, the user can access functionality and receive notifications provided by the subscribed microapp.

System Architecture

FIG. 2 is a block diagram schematically illustrating selected components of an example framework for managing microapp subscriptions for a user or user group. The illustrated framework includes microapp server 100, which is capable of analyzing how a user interacts with various applications, such as subscribed microapps 312, managed applications 314, and/or unmanaged applications 316. As used herein, the term "user" refers to a member of user group 300 who is associated with at least one of the one or more endpoints 310, for example by virtue of the user being logged into, authenticated to, or otherwise using one of endpoints 310. The framework illustrated in FIG. 2 further includes an administration console 200 that is configured to manage and implement microapp subscriptions based on the recommendations generated by microapp server 100. Microapp server 100, administration console 200, and the one or more endpoints 310 communicate with each other via a network 500. Network 500 may be a public network (such as the Internet) or a private network (such as a corporate intranet or other network with restricted access).

Other embodiments may have fewer or more communication paths, networks, subcomponents, and/or resources depending on the granularity of a particular implementation. For example, in alternative implementations the functionality provided by microapp server 100 and administration console 200 are provided by a single entity. Thus references to microapp server 100 and administration console 200 can be understood as encompassing a single entity that provides combined functionality. More generally, it should be appreciated that the embodiments described and illustrated herein are not intended to be limited to the provision or exclusion of any particular services and/or resources. Likewise, while the number of different elements separately illustrated in FIG. 2 is reduced for clarity (see, for example, endpoints 310, subscribed microapp 312, managed application 314, and unmanaged application 316), it will be appreciated that, in general, the framework disclosed herein is capable of analyzing application usage patterns, and managing microapp subscriptions, for any suitable number of endpoints and applications.

Microapp server 100 is configured to generate microapp recommendations by analyzing how users of the one or more endpoints 310 interact with their software applications. Microapp server 100 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain embodiments. As illustrated in FIG. 2, microapp server 100 includes one or more software modules configured to implement certain of the functionalities disclosed herein as well as hardware capable of enabling such implementation.

The implementing hardware may include, but is not limited to, a processor 110, a memory 120, and any other suitable components that enable microapp server 100 to interact with other components of the microapp recommendation framework disclosed herein, or with human users of such framework. Examples of such other components include, but are not limited to, a communication hardware module, a bus and/or interconnect, a display, a textual input device (such as a keyboard), a pointer-based input device (such as a mouse), a microphone, and a camera. For example, a communications hardware module can include one or more interfaces, or any appropriate network chip or chipset, that enable microapp server 100 to access a computer network such as a local area network, a wide area network, a personal area network, or the Internet through a variety of wired and/or wireless connections, including cellular connections.

Processor 110 can be implemented by one or more programmable processors to execute one or more executable instructions, such as a computer program, to perform functions disclosed herein. As used herein, the term "processor" describes circuitry that performs a function, an operation, or a sequence of operations. The function, operation, or sequence of operations can be hard coded into the circuitry or soft coded by way of instructions held in memory 120 and executed by the processor circuitry. Processor 110 can perform the function, operation, or sequence of operations using digital values and/or using analog signals. In some examples, processor 110 can be embodied in one or more application specific integrated circuits, microprocessors, digital signal processors, graphics processing units, microcontrollers, field programmable gate arrays, programmable logic arrays, multicore processors, or general-purpose computers with associated memory. Processor 110 can be analog, digital, or mixed. Processor 110 can be one or more physical processors, which in some cases may be remotely located from microapp server 100. A processor that includes multiple processor cores and/or multiple processors can provide functionality for parallel, simultaneous execution of instructions or for parallel, simultaneous execution of one instruction on more than one piece of data.

Memory 120 can be implemented using any suitable type of digital storage, such as one or more of a disk drive, a redundant array of independent disks, a flash memory device, or a random access memory (RAM) device. In certain embodiments memory 120 is used to store instructions that, when executed using processor 110, cause operations associated with the various modules described herein to be invoked. Memory 120 may include one or more types of RAM and/or a cache memory that can offer a faster response time than a main memory.

The implementing software, on the other hand, may include, but is not limited to, a microapp service 140, a functionality usage summarizer 150, a recommendation generator 160, and any other suitable components that enable microapp server 100 to perform the functionalities disclosed herein. Examples of such other components include, but are not limited to, a communication software module and an operating system. In particular, a communication software module can include any appropriate network software adaptor which allows for wired or wireless connection to other components of microapp server 100 and/or to network 500. This enables microapp server 100 to communicate with other local and remote computing systems, services, and resources, examples of which include administration console 200 and the one or more endpoints 310. As another example of implementing software, microapp server 100 may include any suitable operating system. In general, the techniques provided herein can be implemented without regard to the particular operating system provided in conjunction with microapp server 100, and therefore may also be implemented using any suitable existing or subsequently developed platform.

Still referring to the example embodiment illustrated in FIG. 2, microapp service 140, functionality usage summarizer 150, and recommendation generator 160 are each implemented using a non-transitory computer readable medium (such as memory 120) and one or more processors (such as processor 110) of a computing apparatus. In such embodiments the non-transitory computer readable medium stores program instructions executable by the one or more processors to cause microapp server 100 to perform certain aspects of the techniques disclosed herein. Other embodiments may have fewer or more modules depending on the granularity of a particular implementation.

For example, in certain embodiments microapp service 140 provides the microapps and supporting services that enable a user to access data and functionality provided by one or more underlying applications. Examples of underlying applications include, but are not limited to, SaaS applications, web applications, desktop applications, proprietary applications, managed enterprise applications, and unmanaged applications. Such applications can be hosted locally at one or more of endpoints 310, or may provide functionality to endpoints 310 remotely, such as via an application server. Regardless of its particular implementation, this framework allows a user to view information and perform actions without having to launch the underlying application or toggle to a different interface. To this end, in certain embodiments microapp service 140 includes a plurality of microservices 142 as well as a microapp library 144 that stores the particular microapps. For example, in one implementation microapp service 140 is a single tenant service that creates, manages, and provides implementing services to support the microapps stored in microapp library 144. This can be accomplished through periodic communications with, and data acquisitions from, the underlying applications. In some implementations, microapp library 144 is hosted locally at microapp server 100, such as in memory 120, although in other implementations microapp library 144 is partially or wholly hosted in a networked storage repository.

Microapp service 140 includes one or more microservices 142 that provide implementing functionality to support execution of the microapps stored in microapp library 144. For example, an active data cache microservice is a single tenant service that can store configuration information and microapp data using a per-tenant database encryption key and per-tenant database credentials. A credential wallet microservice can store encrypted service credentials for the applications that underlie the microapp functionality, as well as any required user authentication tokens, such as OAuth2 tokens. A data integration provider microservice can (a) interact with underlying applications to decrypt user credentials and (b) communicate with underlying applications under the identity of the user. Such communications use the user's actual account to ensure that all actions are complaint with applicable data policies. A notification microservice processes notifications created in the course of interacting with the underlying applications. Notifications can be stored in a database, served in a notification feed, and/or transmitted as push notifications. A notification microservice optionally includes content controls that are configurable to restrict exposure of sensitive content. It will be appreciated that the microservices described herein represent only a few examples of microservices that support the creation, administration, and execution of the microapps stored in microapp library 144. Additional or alternative microservices may be included in microapp service 140 in other embodiments.

Referring again to FIG. 2, functionality usage summarizer 150 processes application usage data collected from the one or more endpoints 310. The application usage data characterizes observed user interactions with those applications that provide functionality at endpoints 310, including SaaS applications, web applications, desktop applications, proprietary applications, managed enterprise applications, unmanaged applications, and/or subscribed microapps. Thus, as used herein, the term "application usage data" should be understood as encompassing data that characterizes a user's interactions with both conventional applications and microapps, subscribed or otherwise. In some cases the application usage data includes user profile data, thereby allowing observed usage patterns to be associated with particular user groups. This allows, for instance, a list of the most frequently invoked application functionalities to be compiled for different user groups. This, in turn, provides insight into frequently invoked functionalities for different user groups. User groups can be defined according to any suitable characteristic, including for example work type, role, gender, age, and geolocation. In certain implementations functionality usage summarizer 150 tracks the most (and least) frequently used microapps for individual users and/or user groups, thereby providing insight into the particular microapps that are most important for such users and/or user groups.

The insights generated by functionality usage summarizer 150 can form the basis for microapp recommendations generated by recommendation generator 160. For example, data characterizing frequently invoked functionalities and frequently (or infrequently) used microapps can be passed to recommendation generator 160. In certain implementations recommendation generator 160 can be configured to provide microapp recommendations that administration console 200 (or an administrator using administration console 200) can invoke. In some cases a microapp recommendation may comprise a recommendation that a particular user or members of a particular user group be granted a new subscription to a microapp that would streamline functionality that is currently provided by a more complex enterprise application. In this case, microapp recommendation generator 160 will base its recommendation on the inventory of microapps available in microapp library 144, or in other microapp repositories, such as a cloud-based repository of available microapps. For example, in one implementation recommendation generator 160 is configured to send a query to a microapp repository, such as microapp library 144, to identify one or more microapps corresponding to frequently invoked functionality. In other cases a microapp recommendation may comprise a recommendation that an existing microapp subscription be canceled, expired, or otherwise terminated for a particular user or for members of a particular user group. In general, recommendation generator 160 can be understood a providing a comprehensive evaluation of which microapps should or should not be granted subscriptions for particular users and/or user groups.

Administration console 200 is configured to update microapp subscriptions based on recommendations received from microapp server 100. Administration console 200 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain embodiments. As illustrated in FIG. 2, administration console 200 includes one or more software modules configured to implement certain of the functionalities disclosed herein. These software modules include, but are not limited to, a subscription manager 220 and a user interface 240. Each of these subcomponents can be implemented using a non-transitory computer readable medium that stores program instructions executable by a processor to cause administration console 200 to perform certain of the functionalities disclosed herein. Other embodiments may have fewer or more subcomponents depending on the granularity of a particular implementation. In certain implementations administration console 200 also hosts a repository of microapp subscription data 210 and auto-subscription settings 230.

In an example implementation, subscription manager 220 is configured to manage microapp subscriptions for individual users and for user groups. As described above, microapps are often deployed using a subscription model in which an administrator grants individual users and/or user groups access to a microapp by way of a managed subscription. An administrator can use subscription manager 220 to manage such deployment. Subscription manager 220 leverages microapp subscription data 210 which can be revealed via user interface 240. User interface 240 can also be used to provide information to an administrator regarding the recommendations received from microapp server 100. For example, in some implementations recommendations are presented to an administrator via user interface 240 for approval before implementation, while in other embodiments the recommendations are implemented automatically. As illustrated in FIG. 2, administration console 200 can be configured to store auto-subscription settings 230 that govern how administration console 200 responds to recommendations received from microapp server 100. In some implementations auto-subscription settings 230 are defined by a designated user, such as a user of administration console 200. Regardless of how the recommendations are presented and/or implemented by administration console 200, it will be appreciated that such recommendations may include a recommendation to create a new microapp subscription and/or a recommendation to cancel, expire, or otherwise terminate an existing microapp subscription. More generally, because certain implementations of the microapp recommendation framework disclosed herein use a subscription model to deploy microapp recommendations, this facilitates integration of this framework into existing microapp systems.

The microapp subscription management framework described herein is configured to manage microapp subscriptions for individual users and/or user groups. Thus FIG. 2 illustrates user group 300 comprising a plurality of users, as represented by endpoints 310 to which the users are authenticated. While user group 300 is illustrated in FIG. 2 as including six endpoints 310, it will be appreciated that user group 300 may include fewer or more endpoints in other implementations, and in general, may include any suitable number of endpoints. For example, in an alternative embodiment, application usage can be analyzed and managed for individual users, in which case user group 300 would be understood as including as few as a single endpoint, at least in the case where a particular user works with only a single endpoint. Endpoints 310 are embodied in a computing device, examples of which include, but are not limited to, a desktop computer, a laptop computer, a tablet computer, and a smartphone.

For example, in one implementation application usage across an entire organization can be analyzed and managed. This can be accomplished through the use of a domain application programming interface (API) that allows all members of an organization to be identified. Application and microapp usage rates can then be determined by, for example, calculating a ratio of a quantity of users who use a particular application or microapp to a total quantity of users in the organization. This facilitates reporting that allows an administrator to quickly identify those applications which are frequently used and those microapps which are infrequently used. Segmenting the reporting based on identified user groups further allows resulting microapp recommendations to be more specifically targeted to certain segments of the organization.

Still referring to FIG. 2, example endpoint 310 can be understood as comprising applications, including one or more subscribed microapps 312, one or more managed applications 314, and/or one or more unmanaged applications 316. Endpoint 310 is also optionally configured to provide a user with functionality provided by remotely-located applications, such as SaaS applications and web applications. Functionality associated with any other suitable existing or subsequently developed applications can be provided via the one or more endpoints 310 as well, including proprietary applications and desktop applications. A user interacts with the applications and microapps provided via the one or more endpoints 310. It is these user interactions that are analyzed by microapp server 100 and that ultimately form the basis for the generated microapp recommendations.

Managed applications 314 optionally include a hook 314' that allows application usage data to be harvested and provided to a data gathering agent 318. In general, data gathering agent 318 detects interactions between a user and the applications that the user accesses via endpoint 310. This can be accomplished, for example, using any suitable existing or subsequently developed software that is capable of monitoring user activity and compiling usage information that reflects the monitored activity. One example of such software is hook 314' embedded in managed application 314. For example, in certain implementations hook 314' comprises an activity logger that generates a log of functionality and/or commands that a user invokes in managed application 314. Likewise, in certain implementations data gathering agent 318 includes a browser plugin that is capable of capturing interactions between a user and a web browser. In still other implementations hook 314' is configured to detect each time an application or microapp is executed or initially launched. In still other implementations hook 314' is configured to record a total quantity of time that a user spends interacting with a particular application or microapp. To provide a specific example, in certain embodiments the Citrix Mobile Device Experience (MDX) Toolkit, available from Citrix Systems, Inc. (Ft. Lauderdale, Fla.) is used to gather application usage data. In some cases hook 314' and data gathering agent 318 track frequency of application usage, for example to note how many times per hour, day, week, month, or other period that a particular application or microapp is used. The particular data gathering technique invoked in a given implementation will depend on the type and capabilities of the application being monitored. Examples of monitored interactions include, but are not limited to, application or microapp launch interactions; authentication interactions; data entry interactions (including input provided via a pointing device or keyboard); data display and/or receipt interactions; application context switching interactions; logoff interactions; browser tab, page, and/or window close interactions; browser tab, page, and/or window open interactions; timeout detection; clipboard interactions (including cut, copy, and paste); and hypertext transfer protocol command interactions.

Methodology—Overview

FIG. 3 is a flowchart illustrating an example method 3000 for generating recommendations to subscribe to new microapps and to unsubscribe from infrequently used microapps. Method 3000 can be implemented, for example, using the system architecture illustrated in FIG. 2 and described herein, and in particular, using functionality provided by one or more of microapp server 100, administration console 200, and endpoints 310. However other system architectures can be used in other implementations. To this end, the correlation of the various functionalities shown in FIG. 3 to the microapp server 100, administration console 200, and endpoints 310 is not intended to imply any structural or use limitations. Rather, other implementations may include, for example, varying degrees of integration wherein certain functionalities are effectively performed by different systems or modules. For example, in an alternative implementation functionality provided by both microapp server 100 and administration console 200 are provided by a single entity. Thus other implementations may have fewer or more modules depending on the granularity of a particular implementation. As can be seen, method 3000 includes a number of phases and subprocesses, the sequence of which may vary from one implementation to another. However, when considered in the aggregate, these phases and subprocess are capable of generating and deploying microapp subscription recommendations based on observed user activity. These recommendations may include recommendations to create a new microapp subscription and/or recommendations to terminate an existing microapp subscription.

Method 3000 starts with a data gathering agent 318 provided at endpoint 310 monitoring how applications and/or microapps are used. See reference numeral 3100 in FIG. 3. In certain embodiments where the activity of managed application 314 is monitored, hook 314' is embedded in managed application 314 and provides application usage data to data gathering agent 318. As described above, data gathering agent 318 detects interactions between a user and the applications and/or microapps that the user accesses via endpoint 310. In certain implementations data gathering agent 318 compiles usage data in terms of frequency that a particular application or microapp is used or otherwise active at a given endpoint. In some cases data gathering agent 318 functions as a background process that monitors activity at a given endpoint on an ongoing basis, for example by recording such activity in a log file. In some applications, where recommendations for new microapp subscriptions are to be generated, data gathering agent 318 only monitors usage of managed applications 314. In other applications, where recommendations for terminating existing microapp subscriptions are to be generated, data gathering agent 318 only monitors usage of subscribed microapps 312. In still other applications, data gathering agent 318 monitors usage of both managed applications 314 and subscribed microapps 312, with selected portions of the generated usage data being accessed later according to the needs of a particular application. In still other applications, for example where recommendations for new microapp subscriptions are to be generated, data gathering agent 318 can be implemented at microapp server 100, such a user's interactions with his/her subscribed microapps are monitored remotely from the user's corresponding endpoint.

Data gathering agent 318 is configured generate usage data characterizing the extent of a user's interactions with a wide variety of different applications, including SaaS applications, web applications, desktop applications, proprietary applications, managed enterprise applications, unmanaged applications, and/or existing microapps to which one or more users already subscribe. A wide variety of techniques can be used to generate the usage data, including techniques that monitor particular user interactions with an application. Examples of such techniques are disclosed in PCT Patent Application PCT/CN2020/081406 (filed 26 Mar. 2020), which is hereby incorporated herein by reference in its entirety. Such techniques allow identification of discrete action sequences that characterize a user's interactions with a particular application, and thus such techniques can be used to generate microapp subscription recommendations as disclosed herein. A wide range of existing instrumentation, telemetry, and business insight generation platforms are capable of capturing user interactions, one example of which is Citrix Insight Services provided by Citrix Systems, Inc. (Ft. Lauderdale, Fla.). In addition, while data gathering agent 318 is described here in terms of its operation at a single particular endpoint, in general a plurality of data gathering agents 318 will operate at a corresponding plurality of endpoints, thus allowing usage data characterizing how a large quantity of users interact with applications and microapps. This includes, in certain implementations, most or substantially all of the users comprising a given organization, as determined using a domain API. Optionally, the gathered usage data includes user profile data, thereby allowing observed usage patterns to be associated with particular user groups. Data gathering agent 318 is further configured to send the resulting usage data to microapp server 100. See reference numeral 3200 in FIG. 3.

Upon receiving the usage data from endpoints 310, microapp server 100 generates microapp subscription recommendations. In some cases, microapp server 100 analyzes application usage data (see reference numeral 3400 in FIG. 3) and, based on such analysis, generates recommendations to subscribe to new microapps (see reference numeral 3450 in FIG. 3). Additional details regarding the functionality provided by microapp server 100 to generate recommendations for subscribing to new microapps are provided in FIG. 4. In other cases, microapp server 100 analyzes subscribed microapp usage data (see reference numeral 3500 in FIG. 3) and, based on such analysis, generates recommendations to terminate subscriptions for infrequently used microapps (see reference numeral 3550 in FIG. 3). Additional details regarding the functionality provided by microapp server 100 to generate recommendations to terminate subscriptions for infrequently used microapps are provided in FIG. 5.

Regardless of the particular type of recommendation generated by microapp server 100, such recommendations can be provided to administration console 200. As described above, administration console 200 is configured to manage microapp subscriptions based on the recommendations generated by microapp server 100. See reference numeral 3600 in FIG. 3. Managing the microapp subscriptions may include, for example, providing information to an administrator via user interface 240 regarding the received recommendations. In some embodiments recommendations are presented to an administrator for approval before implementation, while in other embodiments the recommendations are implemented automatically. Either way, processing of the recommendations is optionally governed by auto-subscription settings 230 stored at administration console 200. Managing the microapp subscriptions may further include using subscription manager 220 to update microapp subscription data 210 hosted at administration console 200. Administration console 200 is also optionally configured to send instructions to microapp server 100 to deploy updated subscription information to endpoints 310.

More specifically, microapp server 100 can be configured to send subscribe and/or unsubscribe instructions to endpoints 310. See reference number 3700 in FIG. 3. Where a recommendation applies to a user group 300, the corresponding instructions can be broadcast to all endpoints included in the user group 300. The instructions may include instructions that create new microapp subscriptions 340 and/or instructions that terminate existing subscriptions for infrequently used microapps. Optionally, the instructions include instructions to remove code and/or data associated with unsubscribed microapps 350. In some cases users can be provided with a notification that a subscription has been provided or a new microapp, or that an existing microapp subscription has been discontinued. In other cases the changes can be provided in the background, for example with new microapp functionality being made available at microapp server 100 without any positive notification of such to users, for example, without any specific communication to endpoints 310. In certain embodiments a notification is sent to administration console 200 indicating that either a new microapp subscription has been successfully created, or an existing microapp subscription has been successfully terminated.

Methodology—Generate Recommendation to Subscribe

FIG. 4 is a flowchart illustrating an example method 4000 for generating recommendations to subscribe to new microapps that provide functionality associated with applications that are frequently used by a user or user group. In certain implementations method 4000 functions as a background process that continually or periodically monitors how users of one or more endpoints 310 use the applications provided at the one or more endpoints 310. In other implementations method 4000 can be triggered by an event such as an administrator command. Regardless of the trigger, method 4000 can be understood as beginning with gathering application usage data. See reference numeral 4110 in FIG. 4. For managed applications, one way of gathering usage data is through the use of hook 314' that is embedded in, or that otherwise forms part of, managed application 314. Hook 314' allows data gathering agent 318 to compile usage data in a way that is managed or otherwise controlled by an administrator, such as an administrator that embeds hook 314' into an organization-wide deployment of managed application 314. In other implementations, the application use is monitored remotely, for example at an application server, thereby allowing usage data to be gathered without direct communication with endpoints 310.

Application usage data can be quantified in terms of a frequency that a particular application is used or otherwise active at a given endpoint. In some cases data gathering agent 318 is configured to track the frequency with which an application is used, for example to create a record of how many times per hour, day, week, month, or other period that the application is used, executed, or launched. In other cases data gathering agent 318 is configured to track a total quantity of time that a user spends interacting with a particular application. Other usage metrics can be tracked in other implementations. In addition, usage of a wide range of applications can be monitored, including both managed and unmanaged applications. A wide variety of techniques can be used to generate such usage metrics, including techniques that monitor particular user interactions with an application. Examples of such techniques are disclosed in PCT Patent Application PCT/CN2020/081406 (filed 26 Mar. 2020), which is hereby incorporated herein by reference in its entirety. In a modified embodiment, usage data is gathered by microapp server 100 for a microapp that a user has accessed without a subscription, for example to provide insight into whether the user should be granted a subscription to the microapp. Regardless of the particular metric and application that are tracked, the gathered application usage data can be transmitted to functionality usage summarizer 150 via network.

Functionality usage summarizer 150 analyzes the received application usage data to identify one or more frequently used applications. See reference numeral 4120 in FIG. 4. Application usage can be ranked using any suitable measure, including frequency of application launch, frequency of application interaction, and total time using application. In certain implementations, one or more frequently used applications are identified across an entire group of monitored users. However, in other embodiments one or more frequently used applications are identified for one or more different user groups. The user groups may be defined according to any suitable classification, such as users in a particular department, users having a particular job title or classification, users having a particular rank, users who perform a particular type of work, users having a particular gender, users falling within a particular age range, and users working in a particular geographic region. Other classifications may be used in other embodiments. In some cases an administrator defines the relevant classifications that will form the basis for defining the user groups to be analyzed. This allows for the generation of, for example, a first listing of the n applications that are most frequently used by men, and a second listing of the n applications that are most frequently used by women. In general, n is an integer of any suitable value, for example, an integer between one and ten.

For example, in one implementation frequently used applications can be identified using the following framework:

| Quantity | Definition |
| --- | --- |
| $N_T$ | the number of times a particular user uses a particular application |
| $P_T$ | the period of statistical analysis, for example measured in minutes, hours, days, or the like |
| $F_{AU} = \frac{N_T}{P_T}$ | the frequency of application usage for the particular user and the particular application, defined in terms of a number of uses per unit time |
| $TH_{AU}$ | a threshold of application usage, defined in terms of uses per unit time, above which a user is considered to be a "frequent user" of an application; set as appropriate for a given implementation |
| $N_{FA}$ | a quantity of users who use the particular application with a frequency $F_{AU} \geq TH_{AU}$ ("frequent users"), such that for every user who uses the particular application with a frequency $F_{AU} \geq TH_{AU}$, the quantity $N_{FA}$ is increased by one |
| $N_A$ | a quantity of users in a particular user group |
| $P_{AP} = \frac{N_{FA}}{N_A}$ | the fraction of users in the particular user group who are "frequent users" of the particular application |
| $TH_{AP}$ | a threshold fraction of "frequent users" in a user group, above which the user group (as a whole) is considered as frequently using an application; set as appropriate for a given implementation |

According to this framework, the particular application can be considered to be a frequently used application for the particular user group (as a whole) if the fraction of users in the particular user group who are frequent users of the particular application ($P_{AP}$) is greater than or equal to the threshold $TH_{AP}$, that is, when $P_{AP} \geq TH_{AP}$. Applying this framework to a quantity of applications observed to have been used by a particular user group allows a list of applications sorted by popularity to be generated. This allows one or more frequently used applications to be identified for the user group. Where this framework fails to identify at least one frequently used application, a notification can optionally be provided to an administrator having authority to adjust threshold parameters $TH_{AU}$ and $TH_{AP}$, thus potentially making it easier to identify a frequently used application. Optionally one or more of threshold parameters $TH_{AU}$ and $TH_{AP}$ are automatically adjusted in response to failure to identify at least one frequently used application. In certain embodiments at least a portion of method 4000 is invoked for a plurality of identified frequently used applications.

Once one or more listings of frequently used applications are generated, functionality usage summarizer 150 can be configured to compare these one or more listings with an existing listing of available microapps. This allows functionality usage summarizer 150 to make a determination with respect to whether a microapp exists that provides functionality associated with an identified frequently used application. See reference numeral 4140 in FIG. 4. Functionality usage summarizer 150 may optionally submit a query to microapp library 144 to make such determination. Such query may be submitted where microapp library 144 includes information that links the functionality provided by a given microapp with an application that also provides that same functionality. In an alternative implementation, functionality usage summarizer 150 queries an index or other cross-reference table that enables identification of a microapp that provides functionality associated with an identified frequently used application. In some cases more than one microapp may be identified as corresponding to a given frequently used application, while in other cases it may not be possible to identify any corresponding microapp. Where multiple frequently used applications are identified, regardless of whether for a single user group or for corresponding multiple user groups, the search for a corresponding microapp can be performed for each of the multiple frequently used applications.

A wide range of monitoring techniques can be used to identify the particular functionalities that users frequently invoke within both managed and unmanaged applications. Examples of such techniques are disclosed in PCT Patent Application PCT/CN2020/081406 (filed 26 Mar. 2020), which is hereby incorporated herein by reference in its entirety. Such techniques can be used to generate microapp subscription recommendations as disclosed herein. In general, such monitoring techniques can be understood as identifying discrete action sequences that begin with a "start point" that is represented by a particular user interacting with a particular application, and that end with an "end point" that is represented by a final interaction between the particular user and the particular application. A wide variety of existing tools can be used to identify the different types of interactions that may form a discrete action sequence. For example, a login interaction, such as a user authentication interaction using password authentication, biologic authentication, and/or peer authentication can be monitored using an identity management provider such as Okta, Inc. (San Francisco, Calif.). A wide range of existing instrumentation, telemetry, and business insight generation platforms are capable of capturing a user's browser activity, one example of which is Citrix Insight Services provided by Citrix Systems, Inc. (Ft. Lauderdale, Fla.). A wide range of browser plugins are also capable of detecting a user's browser activity. In general, any suitable existing or subsequently developed tools can be used to detect a start point, an end point, and intervening user actions. In addition, as noted above, a recorded log of user activity may additionally or alternatively be used to detect and identify relevant user actions. Such a user activity log may be configured to record any of the various actions disclosed herein, as well as other relevant actions, including user shortcut actions.

If it is determined that no microapp exists that provides functionality associated with an identified frequently used application, then functionality usage summarizer 150 is optionally configured to report this potential demand for a new (that is, currently unavailable) microapp to administration console 200. See reference numeral 4145 in FIG. 4. For example, a notification identifying the frequently used application can be generated in user interface 240. This informs the administrator of an unmet demand, thus providing an opportunity to develop or otherwise procure a new microapp that meets such demand. Such reporting and notification may mark the end of processing for a given frequently used application, although other frequently used applications can be identified and processed according to method 4000.

On the other hand, if a microapp that provides functionality associated with an identified frequently used application is identified, then functionality usage summarizer 150 can be configured to make a determination with respect to whether the user (or user group) who frequently uses the frequently used application already subscribes to the identified microapp. See reference numeral 4150 in FIG. 4. This can be accomplished, for example, by comparing the identified microapp to a list of subscribed microapps for the relevant user (or user group). In some cases such a list may be stored at microapp server 100, while in other cases such a list can be stored at, and administered by, administration console 200. Where such list is not hosted at microapp server 100, a query may be transmitted to administration console 200 to determine the subscription status of a given microapp. Optionally, an exact match is not required, such that if the relevant user (or user group) already subscribes to a microapp that provides substantially similar functionality to the identified microapp, then this substantial similarity results in a conclusion that the relevant user (or user group) already subscribes to the identified microapp. In one implementation, substantial similarity is established when a designated similarity measure exceeds a defined threshold.

If it is determined that the user (or user group) who frequently uses the frequently used application already subscribes to the identified microapp, then functionality usage summarizer 150 is optionally configured to report such an existing subscription to administration console 200. See reference numeral 4155 in FIG. 4. Such reporting may mark the end of processing for a given frequently used application, although other frequently used applications can be identified and processed according to method 4000. On the other hand, if it is determined that the user (or user group) who frequently uses the frequently used application has not already been granted a subscription to the identified microapp, then recommendation generator 160 can be configured to generate and send a subscription recommendation to administration console 200. See reference numeral 4160 in FIG. 4. Such a subscription recommendation may include, for example, an identification of the recommended microapp and the user (or user group) that should be subscribed to the identified microapp.

Subscription manager 220 can be configured to make a determination with respect to whether received subscription recommendations are to be implemented automatically. See reference numeral 4170 in FIG. 4. Such determination can be made based on, for example, auto-subscription settings 230 hosted at administration console 200. If subscription recommendations are to be implemented automatically, subscription manger 220 can be configured to automatically create a subscription for the user (or user group) to the microapp corresponding to the identified frequently used application. See reference numeral 4172 in FIG. 4. On the other hand, if subscription recommendations are not to be implemented automatically, subscription manager 220 can be configured to recommend that the user (or user group) subscribe to the microapp corresponding to the identified frequently used application. See reference numeral 4174 in FIG. 4. Such recommendation can be made, for example, by displaying a notification to administrator via user interface 240. Alternatively, user interface 240 can be configured to display a listing of recommended microapps for a particular user (or user group), and administrator can create new subscriptions by making selections from such listing. In either case, where auto-subscription functionality is disabled, it is ultimately left to the administrator to create the recommended microapp subscription. New microapp subscriptions can be deployed to the relevant user (or user group) as illustrated in FIG. 3 and as described above. In certain embodiments a notification is sent to administration console 200 indicating that a new microapp subscription has been successfully created. Administration console 200 optionally updates microapp subscription data 210 as appropriate based on the new subscriptions.

Methodology—Generate Recommendation to Terminate Subscription

FIG. 5 is a flowchart illustrating an example method 5000 for generating recommendations to terminate subscriptions for microapps that are infrequently used by a user or user group. In certain implementations method 5000 functions as a background process that continually or periodically monitors how users of one or more endpoints 310 use their subscribed microapps 312. In other implementations method 5000 can be triggered by an event such as an administrator command. Regardless of the trigger, method 5000 can be understood as beginning with gathering microapp usage data. See reference numeral 5110 in FIG. 5. In some cases one or more of subscribed microapps 312 include code that automatically records and/or reports usage data, such as how often the microapp is actually executed at a particular endpoint. In other cases microapp usage data is compiled at microapp server 100, for example by one or more of microservices 142 that provide dedicated usage tracking. In such cases each time an endpoint executes a particular subscribed microapp, such execution can be recorded by, for example, a usage tracking microservice. Here, gathering the microapp usage data may comprise submitting a query to microapp server 100 to acquire particular microapp usage data. Is still other cases a combination of these approaches may be used, with certain microapp usage data being maintained at endpoints 310, while other such data is maintained at microapp server 100.

Microapp usage data can be quantified in terms of a frequency that a particular subscribed microapp is used, executed, or otherwise active at a given endpoint. Such frequency can be expressed in terms of a number of executions per hour, day, week, month, or other relevant time period. In other cases a total quantity of time that a user spends interacting with a particular subscribed microapp is tracked. Still other usage metrics can be tracked in other implementations. Regardless of the particular metric tracked, the gathered microapp usage data can be transmitted to functionality usage summarizer 150 via network.

Functionality usage summarizer 150 analyzes the received subscribed microapp usage data to identify one or more infrequently used microapps. See reference numeral 5120 in FIG. 5. Microapp usage data can be ranked by using any suitable measure, including frequency of microapp execution, frequency of microapp interaction, and total time using microapp. In certain implementations, one or more infrequently used microapps are identified across an entire group of monitored users. However, in other embodiments one or more infrequently used microapps are identified for one or more different user groups. The user groups may be defined according to any suitable classification, such as users in a particular department, users having a particular job title or classification, users having a particular rank, users who perform a particular type of work, users having a particular gender, users falling within a particular age range, and users working in a particular geographic region. Other classifications may be used in other embodiments. In some cases an administrator defines the relevant classifications that will form the basis for defining the user groups to be analyzed. This allows for the generation of, for example, a first listing of the n applications that are least frequently used by men, and a second listing of the n applications that are least frequency used by women. In general, n is an integer of any suitable value, for example, an integer between one and ten.

For example, in one implementation infrequently used microapps can be identified using the following framework:

| Quantity | Definition |
|---|---|
| $N_M$ | the number of times a particular user uses a particular microapp |
| $P_M$ | the period of statistical analysis, for example measured in minutes, hours, days, or the like |
| $F_{MU} = \frac{N_M}{P_M}$ | the frequency of microapp usage for the particular user and the particular microapp, defined in terms of a number of uses per unit time |
| $TH_{MU}$ | a threshold of microapp usage, defined in terms of uses per unit time, above which a user is considered to be a "frequent user" of a microapp; set as appropriate for a given implementation |
| $N_{FM}$ | a quantity of users who use the particular microapp with a frequency $F_{MU} > TH_{MU}$ ("frequent users"); users who use the particular microapp with a frequency $F_{MU} \leq TH_{MU}$ ("infrequent users") are not included in the quantity $N_{FM}$ |
| $N_A$ | a quantity of users in a particular user group |
| $P_{MP} = \frac{N_{FM}}{N_A}$ | the fraction of users in the particular user group who are "frequent users" of the particular microapp |
| $TH_{MP}$ | a threshold fraction of "frequent users" in a user group, below which the user group (as a whole) is considered as infrequently using a microapp; set as appropriate for a given implementation |

According to this framework, the particular microapp can be considered to be an infrequently used microapp for the particular user group (as a whole) if the fraction of users in the particular user group who are frequent users of the particular microapp ($P_{MP}$) is less than or equal to the threshold $TH_{MP}$, that is, when $P_{MP} \leq TH_{MP}$. Applying this framework to a quantity of microapps observed to have been used by a particular user group allows a list of microapps sorted by popularity to be generated. This allows one or more infrequently used microapps to be identified for the user group. Where this framework fails to identify at least one infrequently used microapp, a notification can optionally be provided to an administrator having authority to adjust threshold parameters $TH_{MU}$ and $TH_{MP}$, thus potentially making it easier to identify infrequently used microapps. Optionally one or more of threshold parameters $TH_{MU}$ and $TH_{MP}$ are automatically adjusted in response to failure to identify at least one infrequently used microapp. In certain embodiments at least a portion of method 5000 is invoked for each one of a plurality of identified infrequently used microapps.

Once usage data for subscribed microapps 312 is gathered, a determination can be made with respect to whether any infrequently used microapps can be identified. See reference numeral 5140 in FIG. 5. Such a determination can be made, for example, by analyzing a microapp listing that is sorted by microapp popularity. In some cases separate sorted listings for different use groups can be generated and analyzed. If functionality usage summarizer 150 fails to identify any infrequently used microapps, either for individual users or established user groups, this failure is optionally reported to administration console 200. See reference numeral 5145 in FIG. 5. For example, in certain implementations a notification indicating that no infrequently used microapps can be identified is generated in user interface 240. This informs an administrator that existing microapp subscriptions can be considered to be efficiently deployed. Such reporting and notification may mark the end of processing at a given time, although additional processing according to method 5000 may be performed at a different time and/or for different users or user groups.

If an infrequently used microapp is identified, a determination can be made with respect to whether the user (or user group) who infrequently uses the microapp is required to subscribe to the identified infrequently used microapp. See reference numeral 5150 in FIG. 5. This can be accomplished, for example, by comparing the identified infrequently used microapp to a list of required microapps for the relevant user (or user group). In some cases such a list may be stored at microapp server 100, while in other cases such a list can be stored at, and administered by, administration console 200. Where such list is not hosted at microapp server 100, a query may be transmitted to administration console 200 to determine the subscription requirements for a given user (or user group). If it is determined that the user (or user group) who infrequently uses the microapp is required to subscribe to this microapp, this situation is optionally reported to administration console 200. See reference number 5155 in FIG. 5. For example, in certain implementations a notification identifying the infrequently used microapp and the user (or user group) subject to the subscription requirement is generated in user interface 240. This may prompt the administrator to reevaluate the subscription requirement to determine if it is appropriate given that, in actuality, the user (or user group) infrequently uses the subject microapp.

On the other hand, if it is determined that the user (or user group) who infrequently uses the microapp is not required to subscribe to the identified infrequently used microapp, then recommendation generator 160 can be configured to generate and send an unsubscribe recommendation to administration console 200. See reference numeral 5160 in FIG. 5. Such an unsubscribe recommendation may include, for example, an identification of the infrequently used microapp and the user (or user group) that does not require a subscription to the identified microapp. In response, subscription manager 220 can be configured to make a determination with respect to whether received unsubscribe recommendations are to be implemented automatically. See reference numeral 5170 in FIG. 5. Such determination can be made based on, for example, auto-subscription settings 230 hosted at administration console 200. If unsubscribe recommendations are to be implemented automatically, subscription manager 220 can be configured to automatically implement the unsubscribe recommendation for the infrequently used microapp in any suitable way, such as by affirmatively cancelling the subscription or by passively marking it for expiration or nonrenewal. See reference numeral 5172 in FIG. 5.

If unsubscribe recommendations are not to be implemented automatically, subscription manager 220 can be configured to recommend that the user (or user group) be unsubscribed from the infrequently used microapp. See reference numeral 5174 in FIG. 5. Such recommendation can be made, for example, by displaying a notification to administrator via user interface 240. Alternatively, user interface 240 can be configured to display a listing of existing microapp subscriptions that are recommended for termination, and the administrator can terminate such subscriptions by making selections from such listing. In either case, where auto-subscription functionality is disabled, it is ultimately left to the administrator to terminate subscriptions as deemed appropriate. Optionally, instructions may be sent to endpoints 310 to remove code and/or data associated with unsubscribed microapps 350.

Regardless of whether unsubscribe instructions are to be implemented automatically or manually, such instructions can be transmitted from administration console 200 to microapp server 100, with the microapp server 100 deploying instructions, if any, to the affected endpoints 310. In other implementations, such instructions can be transmitted directly from administration console 200 to affected endpoints 310. In still other implementations, subscriptions can be terminated at microapp server 100, thus eliminating any need for further deployment to endpoints 310. In this case, endpoints 310 may be restricted from accessing functionality associated with unsubscribed microapps 350 at microapp server 100. In certain embodiments a notification is sent to administration console 200 indicating that an existing microapp subscription has been successfully terminated. Administration console 200 optionally updates microapp subscription data 210 as appropriate based on the terminated subscriptions.

CONCLUSION

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims. In addition, the phraseology and terminology used herein is for the purpose of description and should not be regarded as limiting. Any references to examples, components, elements, or acts of the systems and methods herein referred to in the singular can also embrace examples including a plurality. Likewise, any references in plural to any example, component, element or act herein can also embrace examples including only a singularity. References in the singular or plural form are not intended to limit the presently disclosed systems or methods, their components, acts, or elements. The use herein of "including", "comprising", "having", "containing", "involving", and variations thereof is meant to encompass the items listed thereafter and equivalents thereof as well as additional items. References to "or" can be construed as inclusive so that any terms described using "or" can indicate any of a single, more than one, and all of the described terms.

We claim:

1. A system that comprises a microapp server that includes a non-transitory computer readable medium and at least one processor coupled to the non-transitory computer readable medium, wherein the microapp server is configured to generate a recommendation to modify a set of one or more subscribed microapps by:
   gathering, at the microapp server, observational data that characterizes interactions of a user with an application executing at an endpoint, wherein the user is associated with the set of one or more subscribed microapps, and wherein the observational data indicates that the user invoked a particular functionality provided by the application;
   identifying, by the microapp server, based on the observational data, a particular microapp that provides the particular functionality, wherein the particular microapp is not included in the set of one or more subscribed microapps; and
   sending, to an administration console, the recommendation to include the particular microapp in the set of one or more subscribed microapps.

2. The system of claim 1, wherein the microapp server is further configured to implement the recommendation in response to determining that an auto-subscription setting indicates that at least some recommendations generated by the microapp server are to be implemented automatically.

3. The system of claim 1, wherein:
   the administration console is hosted at the microapp server; and
   the administration console is configured to display the recommendation in a user interface before implementing the recommendation.

4. The system of claim 1, wherein:
   the observational data characterizes interactions of a plurality of users with a corresponding plurality of endpoints;
   the microapp server is further configured to identify a user group that includes the user, wherein each user included in the user group has associated therewith a corresponding set of one or more subscribed microapps; and
   the recommendation is a recommendation to modify each set of one or more subscribed microapps.

5. The system of claim 1, wherein the application executing at the endpoint is a managed application.

6. The system of claim 1, wherein:
   the observational data further characterizes interactions of the user with the set of one or more subscribed microapps over a period of time;
   the microapp server is further configured to identify, based on the observational data, an infrequently used microapp that is included in the set of one or more subscribed microapps; and
   the microapp server is further configured to generate a second recommendation to remove the infrequently used microapp from the set of one or more subscribed microapps.

7. A method for identifying a recommended microapp, the method comprising:
   receiving, from an endpoint, at a microapp server, observational data that characterizes interactions between a user of the endpoint and an application executing at the endpoint, wherein a particular interaction of the interactions causes the application to provide a particular functionality, and wherein the user is associated with a set of one or more subscribed microapps;
   identifying, by the microapp server, based on the observational data, a new microapp that provides the particular functionality, wherein the particular microapp is not included in the set of one or more subscribed microapps; and
   sending, to an administration console, a recommendation that the new microapp be added to the set of one or more subscribed microapps that is associated with the user.

8. The method of claim 7, further comprising updating the set of one or more subscribed microapps to include the new microapp.

9. The method of claim 7, wherein identifying the new microapp includes making a determination, by the microapp server, that the new microapp is not included in the set of one or more subscribed microapps.

10. The method of claim 7, wherein the administration console is hosted at the microapp server.

11. The method of claim 7, wherein the recommendation is sent from the microapp server to the administration console via a network.

12. The method of claim 7, wherein:
the observational data characterizes interactions between a plurality of users and a plurality of applications; and
more than one of the plurality of users is observed to have invoked the particular functionality using the particular interaction.

13. The method of claim 7, wherein:
the observational data characterizes interactions between a plurality of users and a plurality of applications;
more than one of the plurality of users is observed to have invoked the particular functionality using the particular interaction; and
identifying the new microapp includes determining that the particular interaction is observed at a frequency that is greater than a threshold frequency during a time period.

14. The method of claim 7, wherein identifying the new microapp includes determining that the particular interaction is observed at a frequency that is greater than a threshold frequency.

15. The method of claim 7, wherein identifying the new microapp includes determining that the particular interaction is one of n-most-frequently observed interactions, $n \leq 10$.

16. The method of claim 7, wherein identifying the new microapp includes querying a microapp library for microapps that provide the particular functionality.

17. The method of claim 7, wherein the particular interaction includes the user initially launching the application.

18. The method of claim 7, wherein the observational data further characterizes a number of times the user has used the application during a time period.

* * * * *